(12) United States Patent
Rimar et al.

(10) Patent No.: US 10,911,314 B2
(45) Date of Patent: Feb. 2, 2021

(54) SYSTEMS AND METHODS FOR DETERMINING ENTRY POINTS FOR MAPPING A NETWORK

(71) Applicant: ServiceNow, Inc., Santa Clara, CA (US)

(72) Inventors: Yuval Rimar, Tel Aviv (IL); Haviv Rosh, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 482 days.

(21) Appl. No.: 15/722,943

(22) Filed: Oct. 2, 2017

(65) Prior Publication Data
US 2019/0104023 A1 Apr. 4, 2019

(51) Int. Cl.
*G06F 15/177* (2006.01)
*H04L 12/24* (2006.01)
*H04L 12/26* (2006.01)
*H04L 29/06* (2006.01)

(52) U.S. Cl.
CPC .......... *H04L 41/12* (2013.01); *H04L 41/0853* (2013.01); *H04L 41/145* (2013.01); *H04L 43/045* (2013.01); *H04L 43/12* (2013.01); *H04L 69/16* (2013.01)

(58) Field of Classification Search
CPC ..... H04L 45/02; H04L 41/0853; H04L 41/12; H04L 43/10; H04L 45/00; H04L 41/145; H04L 67/1068; H04L 12/4641; H04L 43/045; H04L 45/48; H04W 8/005; H04W 40/246
See application file for complete search history.

(56) References Cited

U.S. PATENT DOCUMENTS

| | | | |
|---|---|---|---|
| 5,978,594 A | 11/1999 | Bonnell | |
| 6,182,136 B1 * | 1/2001 | Ramanathan | H04L 29/06 709/202 |
| 6,286,047 B1 * | 9/2001 | Ramanathan | H04L 29/12066 370/229 |
| 6,321,229 B1 | 11/2001 | Goldman | |
| 6,377,987 B1 * | 4/2002 | Kracht | H04L 41/0213 370/254 |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |

(Continued)

*Primary Examiner* — Oleg Survillo
(74) *Attorney, Agent, or Firm* — Fletcher Yoder PC

(57) ABSTRACT

The present approach relates to determining suitable entry points for initiating discovery and mapping of an enterprise service. For example, one or more tables may be utilized that include information regarding connections and/or communication between configuration items (CIs) of the enterprise service. From the tables, a graph may be created with nodes of the graph representing an internet protocol (IP) address and a port associated with the CIs, and edges of the graph representing the connections and/or communication between the CIs. The graph may be traversed according to outbound edges starting from a node with zero or few outbound edges. The nodes that are unreachable, or untraversed, may be flagged as suitable entry point candidates. In some embodiments, the flagged suitable entry point candidates may be reconciled with already known entry points included in the one or more tables.

20 Claims, 8 Drawing Sheets

(56) References Cited

U.S. PATENT DOCUMENTS

| | | |
|---|---|---|
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,155,515 B1 | 12/2006 | Brown et al. |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Meuller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,098,322 B2 | 8/2015 | Apte |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,356,838 B1* | 5/2016 | Wang .................... H04L 41/12 |
| 9,363,252 B2 | 6/2016 | Mueller |
| 9,534,903 B2 | 1/2017 | Cline |
| 9,535,737 B2 | 1/2017 | Joy |
| 9,557,969 B2 | 1/2017 | Sharma |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,929,949 B2* | 3/2018 | Mahadevan ............ H04L 45/02 |
| 9,967,162 B2 | 5/2018 | Spinelli |
| 10,002,203 B2 | 6/2018 | George |
| 2005/0169193 A1* | 8/2005 | Black .................... H04L 12/462 370/254 |
| 2006/0182034 A1* | 8/2006 | Klinker .................. H04L 43/00 370/238 |
| 2006/0291404 A1* | 12/2006 | Thubert ................. H04L 45/00 370/254 |
| 2008/0163064 A1 | 7/2008 | Swildens et al. |
| 2013/0325899 A1* | 12/2013 | Mohaban .............. G06F 16/148 707/791 |
| 2016/0100032 A1* | 4/2016 | Mohaban ................ G06F 16/13 709/223 |
| 2018/0123940 A1* | 5/2018 | Rimar .................... H04L 45/02 |
| 2018/0309634 A1* | 10/2018 | Makovsky ............. H04L 41/12 |

* cited by examiner

| | ≡ COUNT | ≡ DESTINATION IP | ≡ DESTINATION PORT | ≡ IP | ≡ PORT | ≡ WEIGHT1 | ≡ WEIGHT2 | ≡ WEIGHT3 | ≡ WEIGHT4 | ≡ WEIGHT5 |
|---|---|---|---|---|---|---|---|---|---|---|
| ☐ | 4 | 52.94.237.36 | 443 | 10.0.0.39 | 22 | 28.5714286 | | | | |
| ☐ | 9 | 52.94.237.36 | 443 | 10.0.0.182 | 22 | 42.8571429 | | | | |
| ☐ | 4 | 10.0.0.182 | 80 | 10.0.0.139 | 80 | 50 | | | | |
| ☐ | 4 | 52.94.237.36 | 443 | 10.0.0.65 | 22 | 16 | | | | |
| ☐ | 4 | 54.239.19.81 | 443 | 10.0.0.65 | 22 | 23.5294118 | | | | |
| ☐ | 4 | 52.94.237.45 | 443 | 10.0.0.39 | 22 | 26.6666667 | | | | |
| ☐ | 20 | 54.239.27.131 | 443 | 10.0.0.4 | 22 | 23.5294118 | | | | |
| ☐ | 3 | 54.239.29.123 | 443 | 10.0.0.65 | 22 | 15.7894737 | | | | |
| ☐ | 4 | 54.239.21.208 | 443 | 10.0.0.249 | 22 | 16.6666667 | | | | |
| ☐ | 21 | 52.94.225.201 | 443 | 10.0.0.39 | 22 | 18.4210526 | | | | |
| ☐ | 3 | 54.239.19.131 | 443 | 10.0.0.39 | 22 | 20 | | | | |
| ☐ | 5 | 54.239.27.141 | 443 | 10.0.0.65 | 22 | 13.8888889 | | | | |
| ☐ | 52 | 54.239.28.81 | 443 | 10.0.0.4 | 22 | 37.4100719 | | | | |
| ☐ | 75 | 72.21.207.186 | 443 | 10.0.0.182 | 80 | 10.1078167 | | | | |

FIG. 8

SYSTEMS AND METHODS FOR DETERMINING ENTRY POINTS FOR MAPPING A NETWORK

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). To adequately monitor and track the resources within the distributed computing environments, an entry point may be utilized. However, it may be difficult to gather uniform resource locators (URLs) and other entry points to an enterprise service of the distributed computing environment. For example, it may take an excessive amount of time to compile a list of entry points to the enterprise service as it may involve contacting many people within an organization associated with the enterprise service. Indeed, some organizations may not have any or limited knowledge of their enterprise service.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, store, and distribute information. With this in mind, an IT system may include service mapping logic that generates an accurate, service-aware view (e.g., a "service mapping") of the system infrastructure that is frequently refreshed, keeping the view up to date. The service mapping may be constructed by automatically discovering and mapping relationships between IT components running specific services. The service mapping logic may monitor (or periodically probe) the IT infrastructure for service-affecting changes and update the service mapping in real-time. The service mapping may provide a mix of applications and IT components that support a service and provide an understanding of how these applications and components are related.

For example, service mapping may utilize patterns or traffic connections to discover and map configuration items (CIs) (e.g., devices and applications) used within the system infrastructure of an organization. To discover the CIs, a discovery process may start from an entry point, which may be a property of a connection to a CI. For example, an entry point may be a uniform resource locator (URL) or email address associated with a particular CI. From the entry point, service mapping logic may follow outbound connections to discover further CIs of the system infrastructure, from which additional outbound connections may be followed. The discovered CIs may then be added to the service mapping. The disclosed techniques provide for the determination of entry points that are at a terminal communication level (e.g., uppermost level) of the system infrastructure (e.g., "suitable entry points"). Particularly, utilizing entry points at top communication level, as opposed to starting in a layer in the "middle" of the system infrastructure, or middle of a service map of the system infrastructure, allows the service mapping logic to follow communications from the entry point and thoroughly map the CIs of the system infrastructure without risk of missing CI's that are effectively on the wrong side of the entry point, such as an inbound traffic side, and thus not probed. To determine suitable entry points at the top communication levels of the system infrastructure, one or more tables having information regarding communication, or traffic flow, between ports (e.g., I.P. addresses) of the system infrastructure may be considered. To illustrate, the ports may be graphed as nodes with edges between the nodes corresponding to communication between the ports. The graph may be traversed according to the direction of flow of the edges. While the graph is traversed, the nodes that were not traversed (e.g., unreachable) are flagged as entry point candidates. Further, the entry point candidates may be reconciled with already known entry points, such as with already known load balancer entry points. Particularly, if an entry point candidate is already known, the entry point candidate may be deemed redundant in view of existing or known entry points. Once a suitable entry point is determined, a discovery and mapping process may send one or more probes to find the CIs in communication with the determined entry point and add the CIs to the service mapping of the system infrastructure.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 8 is a view of fields of a table that may be utilized by the distributed computing system of FIG. 1 to determine a suitable entry point of a network, in accordance with an embodiment;

DETAILED DESCRIPTION

Figure 1:
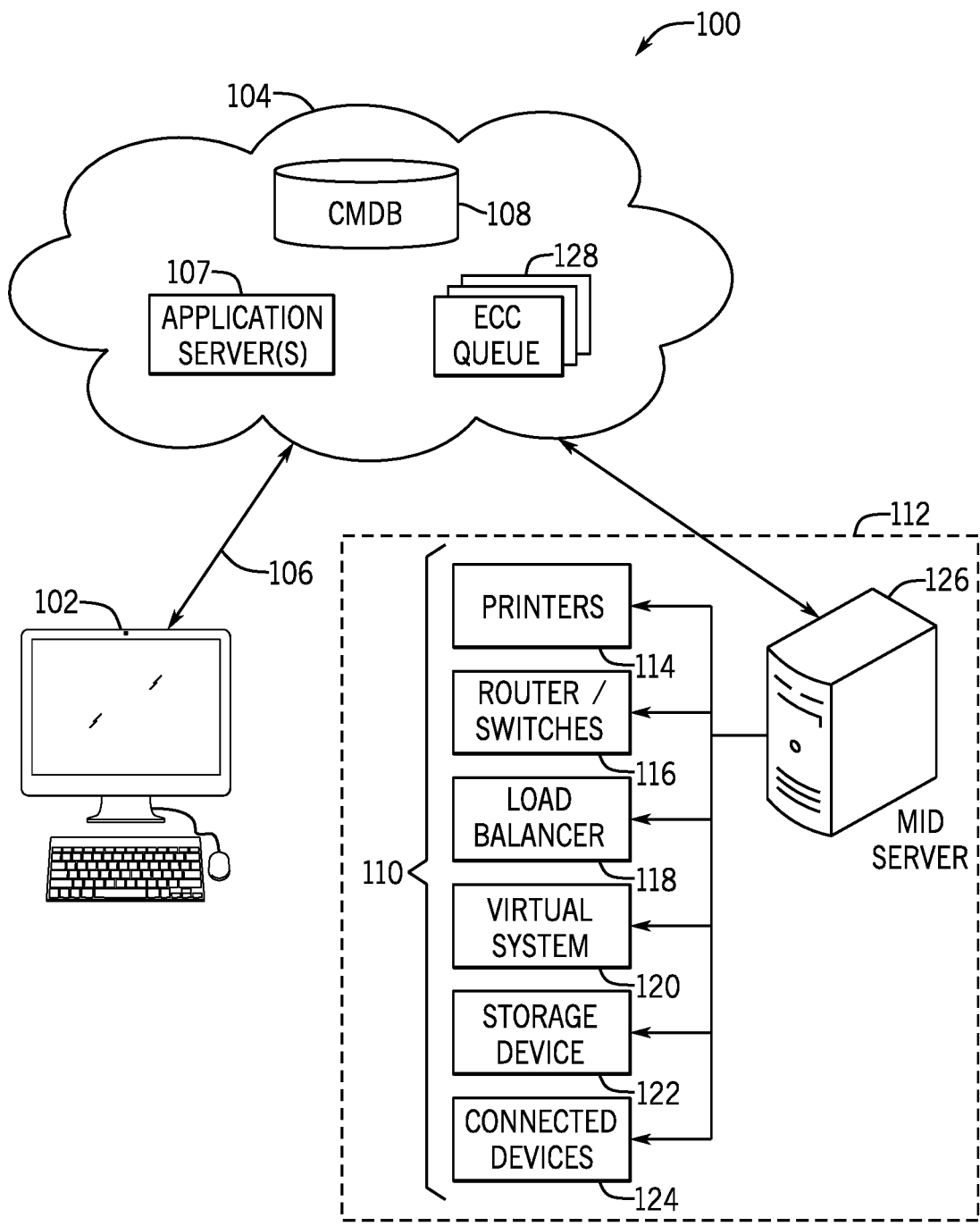
FIG. 1 is a block diagram of a distributed computing system utilizing a cloud service and a configuration management databases (CMDB), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various devices are interconnected within a distributed context. As more and more functions are performed by services using some form of distributed computing, the complexity of IT network management increases. As these devices are separated geospatially, managing and tracking configuration of these devices may become more difficult.

In such an interconnected but distributed context, the configuration of each of these devices may be represented by configuration items (CIs) that detail certain configurations, parameters, components, software, or settings associated with a respective device. As will be discussed in greater detail below, CIs may include information related to a physical entity (e.g., hardware), a logical entity (e.g., version, instance of a database), a conceptual entity (e.g., a service or license), and the like associated with a respective device. Given the wide variety of CIs associated with various devices within this type of complex IT environment and their dynamic nature, configuration item (CI) discovery executed on a given infrastructure is used to track the CIs of the devices that are present on the connected IT environment. That is, CI discovery is the process of finding configuration items, such as hardware, software, documentation, location, and other information related to the devices connected to a given network, such as an enterprise's network. This discovery process may be performed at least partially using automated routines, e.g., an application program or probe, running on the network in question. Particularly, this discovery process may start from an entry point on the network and follow connections between the CIs of the network to discover CIs in communication with the entry point. When a CI is identified by such routines, discovery includes exploring some or all of the CI's configuration, provisioning, and current status. This explored information may be used to update one or more databases, such as a configuration management database (CMDB), accordingly.

The CMDB stores and tracks all of the discovered devices connected to, or controlled by, the network. On computer systems, the discovery process may also identify software applications running on the discovered devices, and any connections, such as Transmission Control Protocol (TCP) connections between computer systems. Discovery may also be used to track all the relationships between computer systems, such as an application program running on one server that utilizes a database stored on another server. CI discovery, which may be intended for full or partial discovery of CIs on the network, may be performed at initial installation or instantiation of connections or new devices, and/or CI discovery may be scheduled to occur periodically to track additions, removals, or changes to the IT devices being managed, thereby keeping data stored on the CMDB current. Thus, using the discovery process, an up-to-date map of devices and their infrastructural relationships may be maintained.

Information technology (IT) networks may include a large number of resources, such as servers, applications, and/or other hardware devices. Each of these devices may have one or more corresponding configuration files that control how the asset functions. These configuration files may facilitate discovery of the corresponding devices.

By way of introduction and to provide context for concepts discussed herein, FIG. 1 is a block diagram of a system 100 that utilizes distributed computing framework, which may perform or benefit from one or more of the techniques described herein. As illustrated in FIG. 1, a client 102 communicates with a platform 104, e.g., a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs capable of running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together and communicate using one or more networks. For instance, the platform 104 may be a cloud service platform that includes various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionalities, such as gateways, routers, load balancers, databases, application servers running application programs on one or more nodes, or other devices that may be accessed via the platform 104. For example, the client 102 may connect to an application server 107 and/or databases, such as the configuration management database (CMDB) 108, via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the CMDB 108).

The CMDB 108 is a series of tables containing information about all of the assets and enterprise services controlled by a client 102 and the configurations of these assets and services. The assets and services include configuration items (CIs) 110 that may be computers, other devices or hardware on a network (or group of networks), software contracts and/or licenses, or enterprise services. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; storage constructs such as data files, data directories, or storage models, and/or conceptual resources, such as software or application licenses. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and/or the like. The CMDB 108 may include an index of CIs 110, attributes (e.g., roles, characteristics of elements, etc.) associated with the CIs 110, and/or relationships between the CIs 110. Furthermore, the CMDB 108 may track which configuration files identified pertain to each CI 110.

Additional to or in place of the CMDB 108, the platform 104 may include one or more other database servers. The database servers are configured to store, manage, or otherwise provide data for delivering services to the client 102 over the communication channel 106. The database server includes one or more databases (e.g., CMDB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely, such as at a client site.

In the depicted topology, access to the platform 104 is enabled via a management, instrumentation, and discovery (MID) server 126 via a communication queue 128, such as an External Communications Channel (ECC) Queue. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

As discussed below, the MID server 126 may periodically and/or intermittently use discovery probes to determine information on devices, or CIs 110, connected to the network 112 and return the probe results back to the platform 104. Probes may have different types and functions. For example, some probes may identify devices running specific operating systems (e.g., Windows or Linux) while other exploration probes may return disk information for those devices using the operating systems. Some probes run a post-processing script to filter the data that is sent back to the platform 104.

As a non-limiting example, the probe types available for use by the MID server 126 may include a Common Information Model (CIM) probe that utilizes the CIM query language to query a CIM server using Web-Based Enterprise Management (WBEM) protocols, a Simple Network Management Protocol (SNMP) probe to discover information about network device (e.g., routers), a Windows Management Instrumentation (WMI) Runner probe that uses the WMI to obtain information about a Windows-based device, a Powershell probe that executes Powershell scripts (e.g., Powershell V2 scripts) on a host for the MID server 126, a Secure Copy (SCP) Relay Probe that copies a file or directory contents from one host to another via the MID server 126, a Secure Shell (SSH)-based probe that executes a shell command on a target host and returns the output, a Shazzam probe that determines what devices are active using a targeted port scan, a user-defined probe class, a multi-probe that combines probe types, and/or any combination thereof.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112 and the communication queue 128.

The communication queue 128 may be a database table that is typically queried, updated, and inserted into by other systems. Each record in the communication queue 128 is a message from an instance in the platform 104 to a system (e.g., MID server 126) external to the platform 104 that connects to the platform 104 or a specific instance running in the platform 104 or a message to the instance from the external system. The fields of a communication queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message. The agent field identifies a name (e.g., mid.server.xxxx) of the external system that the message is directed to or originates from. The topic field is a value (e.g., arbitrary values) that indicates that a message pertains to a particular subject. For example, during discovery of CIs 110, the topic field may be populated with a value to identify a name of the probe that has been/is going to be run. The name field provides more detail in a context indicated by the topic field. For example, in discovery, the name field may be a descriptive and human-readable name or a command to be run by the probe identified in the topic field. Alternatively, if the topic field contains "SSHCommand", the name field may indicate the shell command to be run.

The source field indicates a target or recipient of the message outside of the platform 104. In discovery, the source field may contain an Internet Protocol (IP) address that the discovery probe is to be/has been run against, or the field may include a human-readable description when the probe is to be/has been run against multiple IP addresses. For example, the IP address may in certain circumstances be an entry point identified by the approaches discussed herein.

The response to field, when included, contains a reference (e.g., sys_id) to the communication queue 128 that the message is a response to. In discovery, a discovery result may be a response to a discovery schedule message.

The queue field indicates whether the message is incoming to the platform 104 or outgoing from the platform 104. The state field indicates whether the message is ready to be processed, is being processed, or has been processed. The recipient of the message generally updates this field. The time created field indicates when the record was first stored in the communication queue 128. The time processed field indicates when the record was updated to processed.

In some embodiments, the messages are sequenced using a sequencing field that includes a number assigned at generation of the record. The error string field, when included, indicates that an error occurred and/or a type of error that occurred.

The payload field is the body of the message. The contents of this field are specific to the context of the record and the system that is exchanging information with the platform 104. For example, a result of a discovery probe may use Extensible Markup Language (XML) documents for the payload. For instance, in some embodiments, the returned XML document may have a root tag of  containing one or more <result> tags and a single <parameters> tag. The parameters are simply an echo of those sent to the MID server 126 in the probe.

Although the system 100 is described as having the application servers 107, the CMDB 108, the ECC queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the platform 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
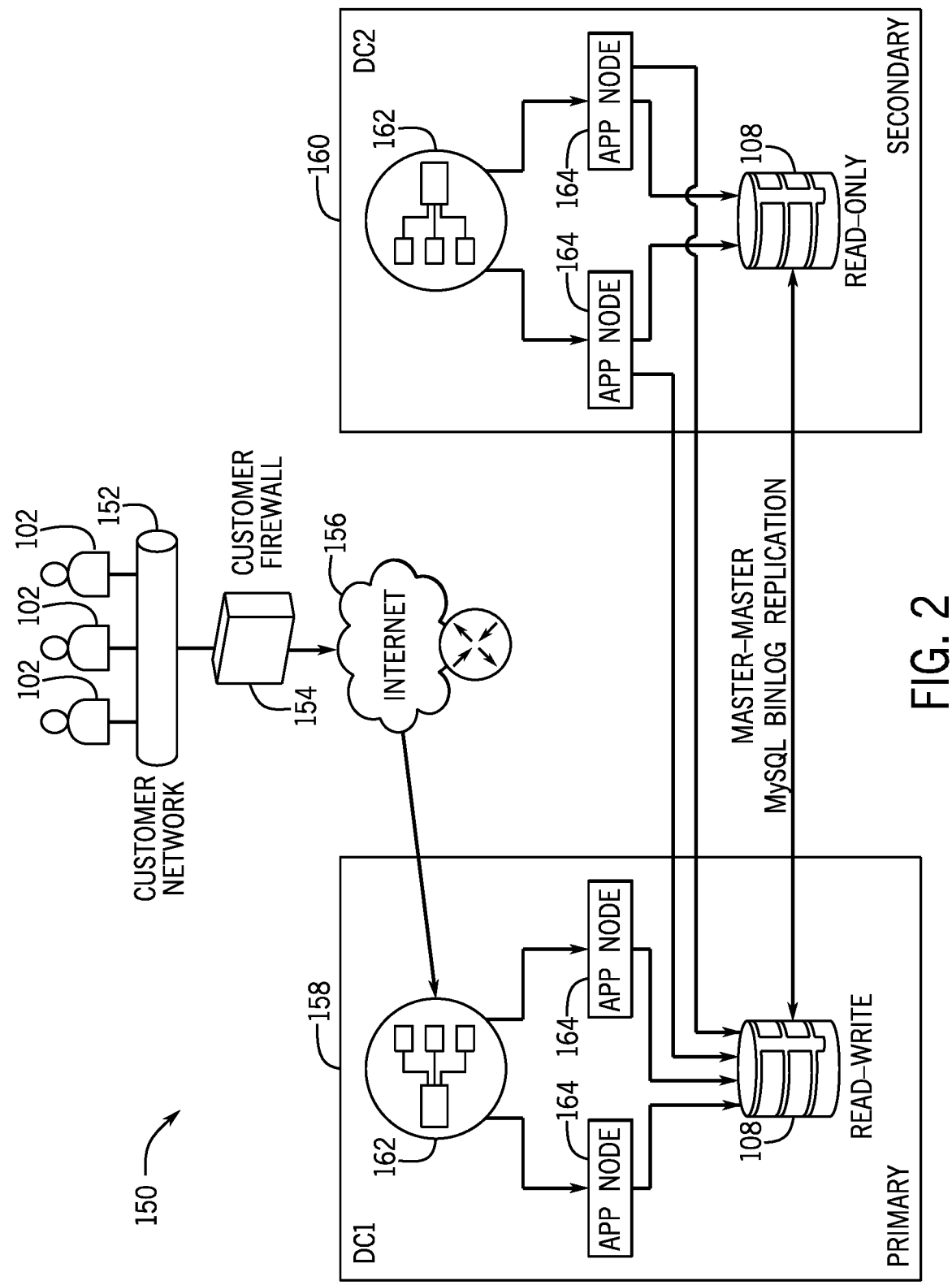
FIG. 2 is a schematic of an embodiment of a multi-instance architecture that may be utilized by the distributed computing system of FIG. 1, in accordance with an embodiment.

FIG. 2 is a schematic of an embodiment of a multi-instance architecture 150 that may be utilized by the distributed computing system 100 of FIG. 1. As shown, one or more clients 102 are connected to a customer network 152, which may or may not be protected by a firewall 154. The one or more clients 102 may access first and second virtual machines 158, 160 via the Internet 156. In the illustrated embodiment, the first virtual machine 158 is a primary virtual machine 158 and the second virtual machine 160 is a secondary virtual machine. The primary and secondary virtual machines 158, 160 are disposed in different data centers. Other embodiments may include more than two virtual machines (e.g., multiple secondary virtual machines). As shown, each of the virtual machines 158, 160 includes at least one load balancer 162, multiple application nodes 164, and a DB 108. In the illustrated embodiment, the database 108 of the primary virtual machine 158 is read-write and the database 108 of the secondary virtual machine 160 is read-only. The databases 108 are replicated via MySQL binlog replication for near real-time replication between the primary database 108 and the secondary database 108. As shown, the application nodes 164 of the primary virtual machine 158 may access the primary database 108, while the applications nodes 164 of the secondary virtual machine 160 may access both the primary database 108 and the secondary database 108.

Each customer may have its own dedicated virtual machines 158, 160 and database processes. Further, full and incremental backups may be scheduled as the customer wishes (e.g., daily, weekly, bi-weekly, monthly, etc.). The multi-instance architecture 150 results in full instance redundancy for all production instances with near real time replication and no comingling of data between customers. By providing customers with their own database(s) 108, customers are isolated from database maintenance and/or database failure of other customers. Further, maintenance and repair windows are shorter. In some embodiments, a client may pull data from multiple different databases 108 distributed over multiple virtual machines 158 and/or data centers. The pulled data may then be combined and used as inputs to perform a task, such as dynamic scheduling of service appointments.

Figure 3:
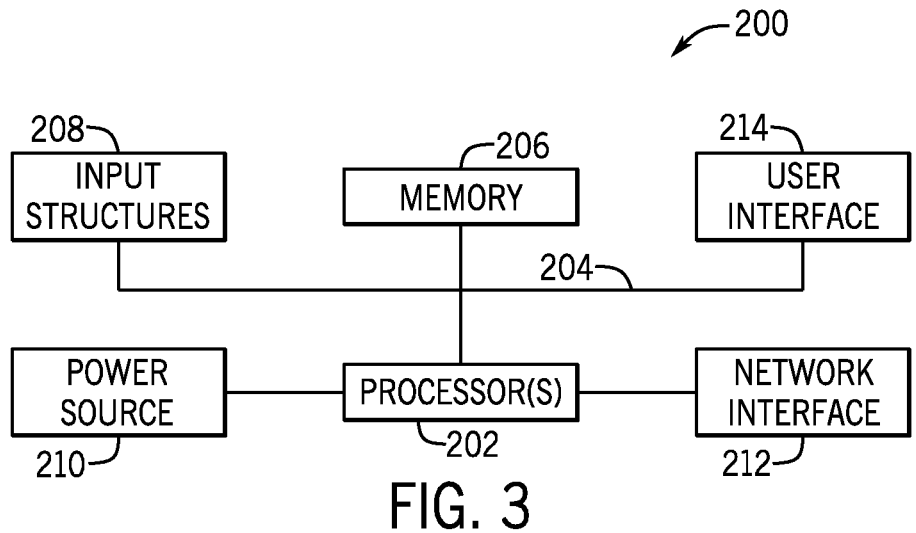
FIG. 3 is a block diagram of a generalized computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 3. FIG. 3 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., CMDB 108), other servers in the platform 104 (e.g., server hosting the communication queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other suitable circuitry performing functions by executing instructions stored in the memory 206 or in an otherwise accessible location. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. The one or more processors 202 may also include specialized processors, such as a graphics processing unit (GPU).

The one or more busses 204 include suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 3, the memory 206 can be implemented using multiple physical units of the same or different types in one or more physical locations. The one or more processor 202 may access data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. In addition and/or alternative to the display, the user interface 214 may include other devices for interfacing with a user. For example, the user interface 214 may include lights (e.g., LEDs), speakers, haptic feedback, and the like.

Figure 4:
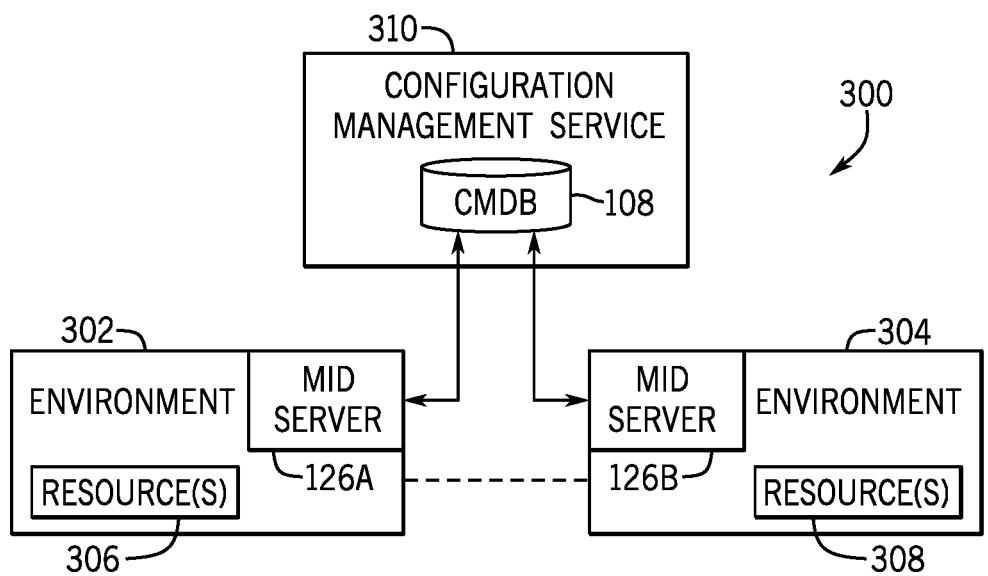
FIG. 4 is a block diagram of an electronic computing and communication system that utilizes the CMDB of FIG. 1, in accordance with an embodiment.

FIG. 4 is a block diagram of an embodiment of an electronic computing and communication system 300 for discovering and/or managing connected configuration items. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping.

For example, the environments 302, 304 may include a customer service environment used to represent customer service infrastructure in a technical support, sales, billing, and/or other groupings. Similarly, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account including resources that may be spatially distant from each other. In some embodiments, resources 306, 308 of the environments 302, 304 may communicate with each other across environments. However, in some embodiments, aspects of various environments may be provided by different vendors without communication there between. In such embodiments, the resources of disparate environments may communicate using the platform 104 (e.g., a configuration management service 310 that is a part of a cloud service platform 104 including the CMDB 108). The resources 306 and 308 may include any suitable configuration item 110 previously discussed.

The configuration management service 310 may include one or more servers providing access to and managing the CMDB 108. The configuration management service 310 may allocate or provision resources, such as application instances in the resources 306 or 308 from a respective environment 302 or 304. Further, the configuration management service 310 may create, modify, or remove information in the CMDB 108 relating to the resources 306 or 308. Thus, the configuration management service 310 may manage a catalogue of resources in more than a single environment (even if the environments do not directly communicate with each other). Using this catalogue, the configuration management service 310 may discover new resources, provision resources, allocate resources, modify, and/or remove resources from the catalogue across a single environment or multiple environments. In some embodiments, these actions may be initiated as part of an operation executed on a client 102, may be scheduled for periodic occasions (e.g., periodic discovery), or may be a combination thereof. For example, a client 102 may receive a request, via its input structures, to query an identity of an application program interface (API) used by a resource to access a particular vendor/provider for the environment 302 that is passed to the configuration management service 310 to query the CMDB 108. As another example, the client 102 may receive a request, via its input structures, to query an identity of a user authorized to access a particular resource that is passed to the configuration management service 310.

As previously discussed, the CMDB 108 may be populated utilizing a discovery process which may be used to discover the resources 306 or 308. Moreover, as previously discussed, the discovery process may include determining the properties or attributes of the resources 306 or 308 in their respective environments 302 or 304 using a respective MID server 126A or 126B. In the illustrated embodiment, each environment 302 and 304 has its own MID server 126A and 126B. In some embodiments, a single MID server may be employed when the MID server may reach into multiple environments. For example, if the MID server is run in the platform 104 (e.g., in the configuration management service 310), a single MID server may be used to manage both environments 302 and 304. Additionally or alternatively, if the MID server 126A has access to the environment 304, the MID server 126B may be omitted.

Each discovered resource is identified as a configuration item 110 with a record stored in the CMDB 108 including data indicating properties, attributes, dependencies, or other information about the resource. The CMDB 108 may be encoded, for example, as a relational database management system (RDBMS); an object-oriented database (e.g. an XML database); a network model database; or a flat-file database.

Figure 5:
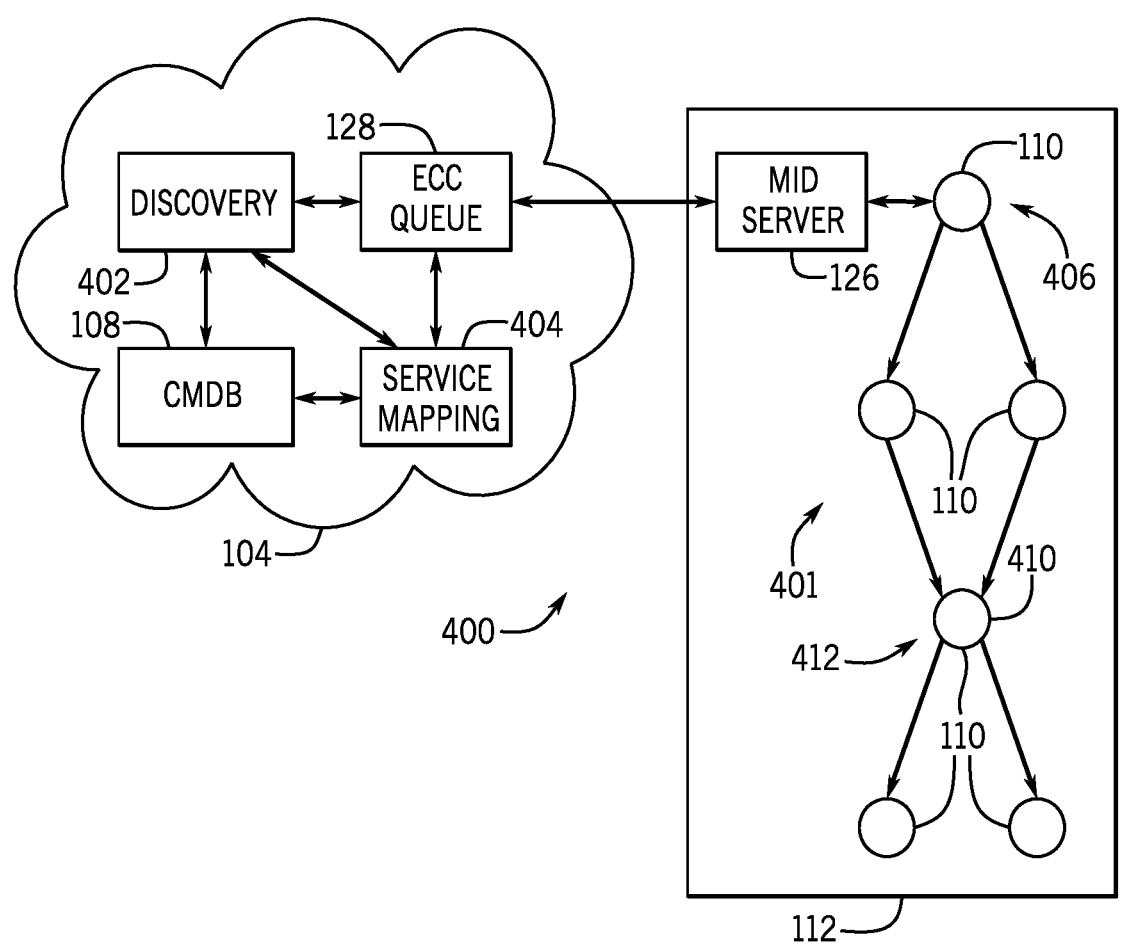
FIG. 5 is a block diagram illustrating communications within the distributed computing system of FIG. 1, in accordance with an embodiment.

In systems with multiple CIs 110 it may be difficult and/or time-consuming to determine suitable entry points for probing a network to discover or update the multiple CIs 110. FIG. 5 is a block diagram of a system 400 that may be utilized in discovering and mapping CIs 110 of an enterprise service 401 of a network 112 utilizing a probe or discovery at an entry point to a network of devices. For example, the system 400 includes the platform 104 which may communicate with the MID server 126 via the communication queue 128 to carry out processes of the system 400. Particularly, the platform 104 may initiate discovery 402 and service mapping 404 to discover and map the CIs 110 of the enterprise service 401. Further, it should be noted that the representation of the enterprise service 401 as depicted in FIG. 5 is merely an example of CIs 110 and a possible combination of communication paths between the CIs 110 of the enterprise service 401 and is not intended to be limiting in scope.

Discovery 402 and service mapping 404 may be processes implemented on software and/or hardware devices utilized by the platform 104. For example, in certain embodiments, discovery 402 and service mapping 404 may be one or more sets of instructions stored on and configured to be implemented by any computing system, such as a desktop computer, laptop computer, server computer, and/or any other computing device of the platform 104 capable of executing the set of instructions.

Discovery 402 and service mapping 404 may utilize patterns and/or follow traffic-based discovery to discover and map the CIs 110. A pattern is a sequence of operations whose purpose is to establish attributes of a CI 110 and its outbound connections. Traffic-based discovery refers to following traffic connections, or inbound and outbound connections, between CIs 110 to discover the CIs 110.

Discovering and mapping the CIs 110 of the network 110 begins with an entry point being defined for a particular CI 110 of the network 112. An entry point as used herein is a property of a connection to a CI (e.g. CI 110). For example, to map an electronic mailing enterprise service, an email address may be defined as an entry point. In some embodiments, a user may define the entry point (e.g., via the client 102). However, it may be difficult to obtain a suitable entry point for the network 112 from a user. For example, in some embodiments, the network 112 may be associated with a large organization with many CIs 110. Accordingly, it may be challenging for one or more users to keep track of the plethora of applications and services (e.g., CIs 110) and to know what the suitable entry points are for the network 112.

Once an entry point is defined, discovery 402 and/or service mapping 404 may initiate one or more probes to gather information regarding the CI 110 (and downstream CIs 110) associated with the defined entry point. For example, at the request of service mapping 404, discovery 402 may gather data, via the probes, indicative of properties of the CI 110 associated with the defined entry point including outbound connections from the CI 110. Discovery 402 may then communicate the gathered data to service mapping 404. Service mapping 404 may then write the information regarding the discovered CI 110 into the CMDB 108 and add the discovered CI 110 to a view of the system infrastructure of the enterprise service (e.g., a service mapping). Service mapping 404 may continue to create discovery requests as described above for all applications to which the discovered CI 110 connects. Discovery and mapping of the CIs 110 of the enterprise service 110 may be completed when the service mapping 404 discovers and maps a CI 110 that does not have any outbound connections or is marked as a boundary.

Indeed, a suitable entry point may be associated with a CI 110 at a top level 406 of the enterprise service 401. For example, CIs 110 at the top level 406 of the enterprise service 401 may have many outbound connections and/or may communicate with other CIs 110 with many outbound connections. Particularly, CIs 110 at the top level 406 may enable discovery 402 and service mapping 404 processes to thoroughly discover and map services and devices (e.g., the CIs 110) within the enterprise service 401. Indeed, CIs 110 with few or no outbound connections may not be suitable entry points as discovery 402 and mapping 404 may not be able to find other CIs 110 through patterns and traffic-based discovery as mentioned above. For example, a load balancer at the top level 406 may be a suitable entry point as it may be communicatively coupled to many CIs 110 of the enterprise service 401 through the load balancer's outbound connections. However, in some embodiments, a load balancer 410 may be in a "middle" layer 412 of the enterprise service 401, such as to balance traffic associated with a particular application, and as such, the load balancer 410 may not be communicatively coupled to a substantial portion of the CIs 110 (i.e., the upstream portion of the network) through the load balancer's 410 outbound connections. Accordingly, a load balancer 410 in the middle layer 412 may not enable discovery 402 and service mapping 404 to thoroughly discover and map the enterprise service 401.

Thus, a suitable entry point may be required to adequately discover and map the enterprise service 401. For example, if a CI 110 with few or no outbound connections is defined/identified as the entry point, discovery 402 and service mapping 404 may not discover and map all of the CIs 110 of the enterprise service 401 from the entry point, thereby producing an incomplete service map. In such embodiments, the platform 104 may utilize additional entry points to discover and map the remainder of the CIs 110 of the enterprise service 401. However, the use of additional entry points to map the enterprise service 401 may also require additional computing power and/or may be inefficient.

Figure 6:
FIG. 6 is a view of fields of a table that may be utilized by the distributed computing system of FIG. 1 to determine a suitable entry point of a network, in accordance with an embodiment.
Figure 7:
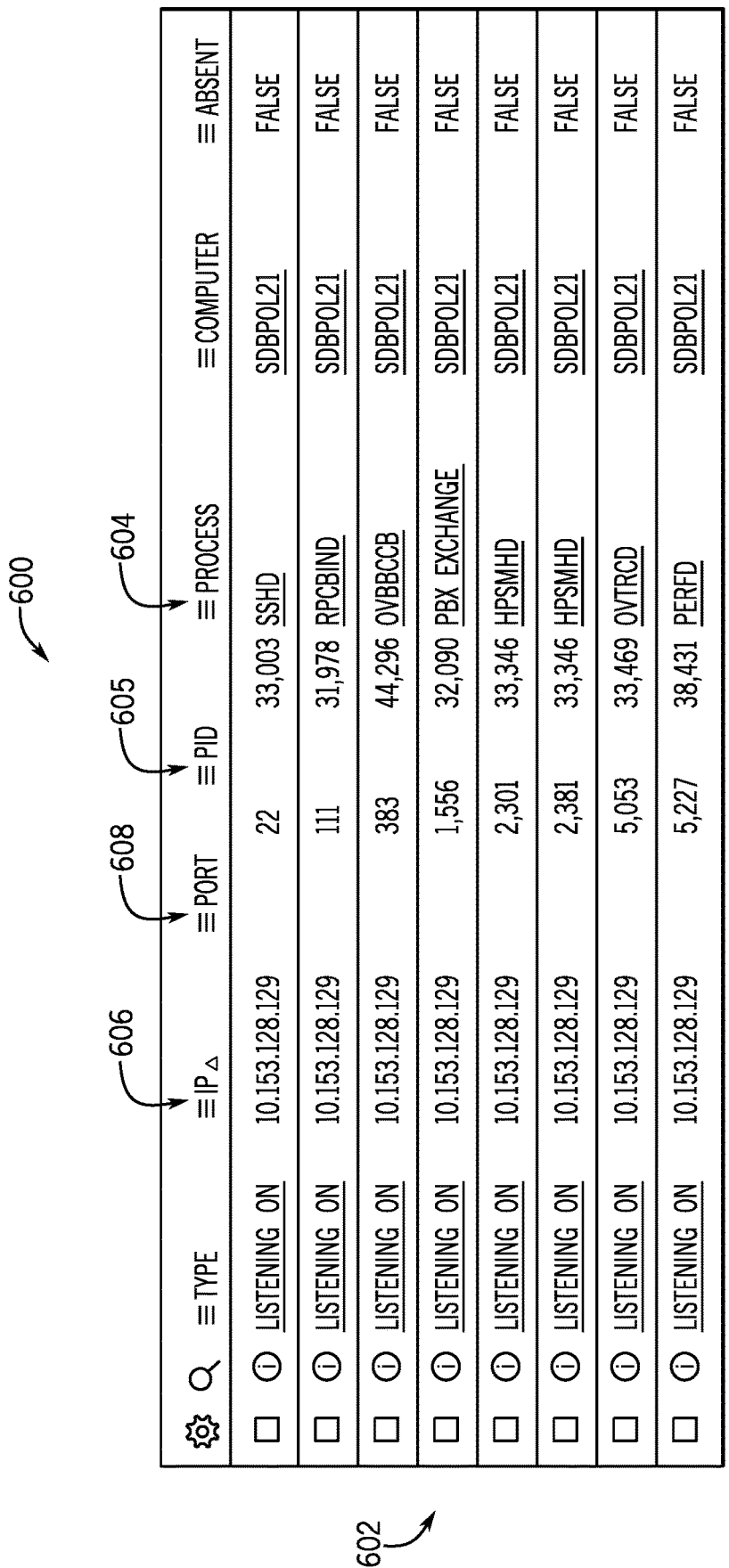
FIG. 7 is a view of fields of a table that may be utilized by the distributed computing system of FIG. 1 to determine a suitable entry point of a network, in accordance with an embodiment.

Accordingly, the platform 104 may determine one or more suitable entry points by utilizing information (e.g., data) associated with traffic connections between the CIs 110, which may be stored in a database, such as the CMDB 108 or other databases maintained that traffic flow between devices and/or applications on a network. For example, FIGS. 6-8 represent views of various fields of one or more tables that may be stored within the CMDB 108. The entries of the various fields may be utilized to determine the one or more suitable entry points. Specifically, as discussed in further detail below, the entries of the various fields may be utilized to graph nodes with connections based on the information from the one or more tables. Suitable entry point candidates may then be determined from the graphed nodes through one or more algorithms.

Particularly, FIG. 6 is a view of a connecting-to field 500 of a table (e.g., a "cmbd_tcp" table) having one or more entries 502 (e.g., rows) representing incoming traffic connections between the CIs 110 of the enterprise service 401. As mentioned above, the connecting-to fields 500 may be stored within a table of the CMDB 108. Further, as discussed in detail below, each entry 502 of the connecting-to field 500 may be graphed as a node with one or more edges connecting to one or more other nodes based on the information within the entry 502. For example, in the connecting-to field 500, an entry 502 may indicate that a process 504 (e.g., nbdisco, bptm, bprm, etc.) with an associated process identification number 505 (PID) is talking to an IP 506 on a port 508. Accordingly, the IP 506 and the port 508 in the connecting-to field 500 may be graphed as a node with an incoming edge from another node representative of the process 504.

Further, FIG. 7 is a view of a listening-on field 600 of a table (e.g., a "cmbd_tcp" table) having one or more entries 602 (e.g., rows) representing outgoing traffic connections between the CIs 110 of the enterprise service 401. As mentioned above, the listening-to fields may be stored within a table of the CMDB 108 or other suitable database. Indeed, in some embodiments, the connecting-to field 500 (FIG. 6) and the listening-on field 600 may be stored within a single table or separate tables of the CMDB 108. Further, as discussed in detail below, each entry 602 of the listening-on field 600 may be graphed as a node with one or more edges connecting to one or more other nodes based on the information within the entry 602. Specifically, in the listening-on field 600, an entry 602 may indicate that a process 604 (e.g., sshd, rpcbind, ovbbccb, etc.) with a PID 605 is listening on an IP 606 on a port 608. Accordingly, the IP 606 and the port 608 in the listening-on field 600 may be graphed as a node with an outgoing edge to another node representative of the process 604.

In some embodiments, tables may be populated by the entries 502, 602 as a result of one or more commands of a discovery process. Particularly, as discussed above, the input structures 208 may be used to input commands to the one or more machines, or processors 202. For example, a user may utilize a list open files (lsof) command to return active TCP connections to populate the connecting-to field 500 and/or the listening-on field 600. Additionally, or in the alternative, a user may also utilize a network statistics command (netstat) to retrieve network statistics for an affected resource (e.g., the enterprise service 401). The netstat command may be used with any workflow to retrieve network statistics.

FIG. 8 is a view of a communication field 700 of a table (e.g., a "sa_flow_connection" table) having one or more entries 702 (e.g., rows) representing connections within an organization (e.g., the enterprise service 401). Particularly, a netflow protocol may be used to populate the table by collecting data about the CIs 110 and the connections between the CIs 110. In other words, the entries 702 of the communication field 700 may represent chains or links between CIs 110. For example, in the current embodiment, the netflow protocol may have discovered a connection, or chain, from an IP 704 and a port 706 of a particular entry 702 to a destination IP 708 and a destination port 710 of the particular entry 702. In some embodiments, a discovered connection may signify that each time the IP 704 and the port 706 of the particular entry 702 was contacted, a connection may have occurred to the destination IP 708 and the destination port 710 of the particular entry 702.

The connections (e.g., the entries 702) discovered via the netflow protocol may be utilized to graph nodes in a graph analysis. For example, as discussed above, a connection may have been discovered from particular IP 704 and port 706 to a particular destination IP 708 and destination port 710. Accordingly, a node representing the particular IP 704 and port 706 be graphed with a connection (e.g., an outgoing connection, an outgoing edge) to a node representing the particular destination IP 708 and destination port 710.

Figure 9:
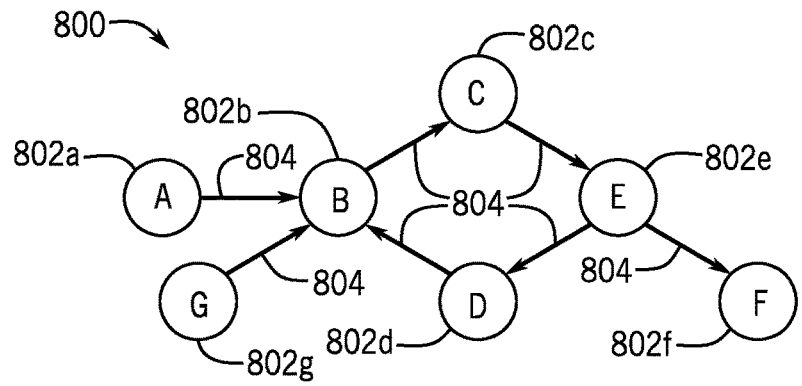
FIG. 9 is a view of a graph that may be generated based on information from the tables of FIGS. 6, 8, and/or 7 and may be utilized by the distributed computing system of FIG. 1 to determine a suitable entry point of a network, in accordance with an embodiment.
Figure 10:
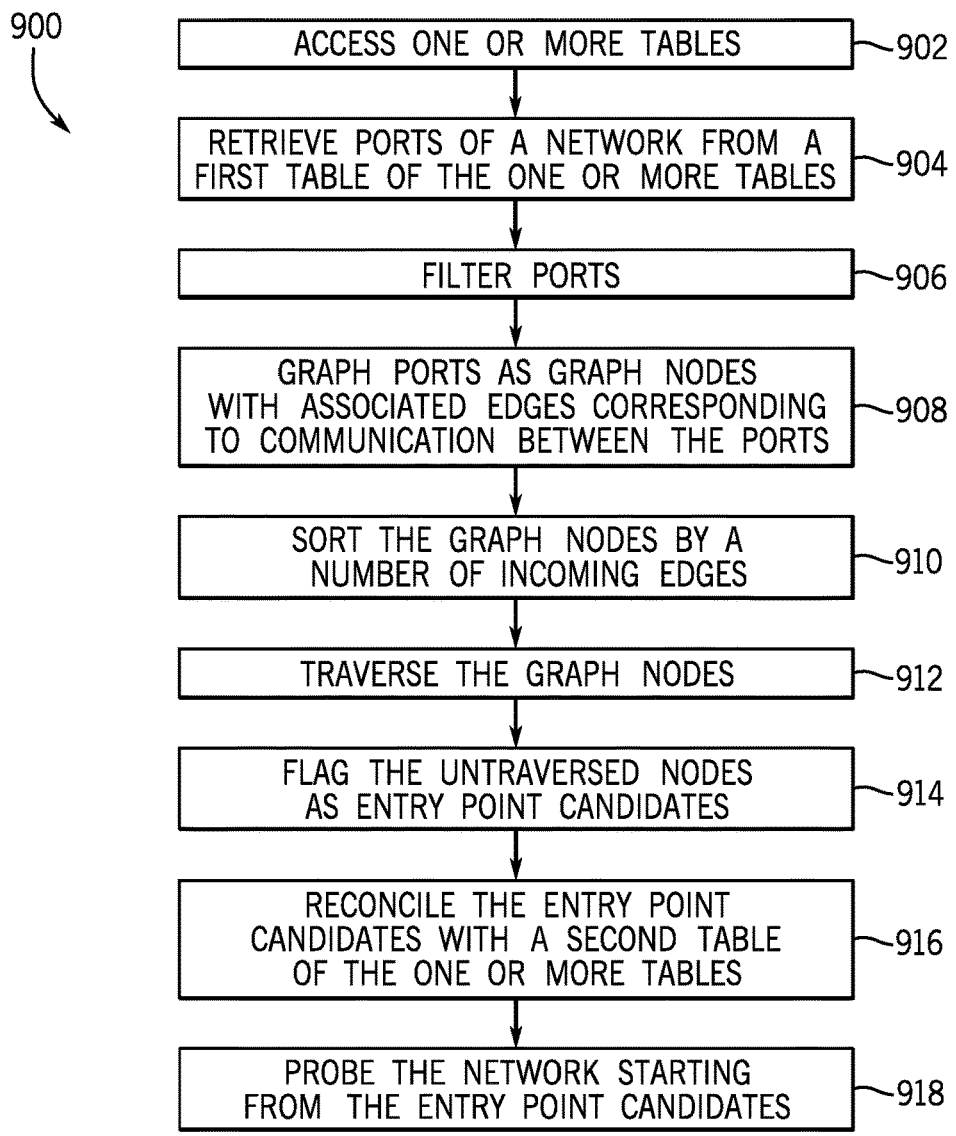
FIG. 10 is a flow chart of an algorithm that may be utilized by the distributed computing system of FIG. 1 to determine a suitable entry point of a network, in accordance with an embodiment.

FIG. 9 is an example of a graph 800 produced based on connections from entries (e.g., entries 502, 602, 702) of one or more tables. Indeed, nodes 802 of the graph 800 may represent CIs 110, and edges 804 of the graph 800 may represent connections (e.g., communications, chains, etc.) between the CIs 110. The edges 804 may indicate an associated traffic flow direction. In some embodiments, the nodes 802 may represent the CIs 110 via an IP and port (e.g., IP:port) associated with the CI 110. As mentioned above, the graph 800 may be utilized to determine suitable entry point candidates via one or more algorithms. Accordingly, FIG. 10, which will now be discussed in parallel with FIG. 9, is a flow diagram representing an entry point algorithm 900 that may determine one or more suitable entry points utilizing a graph that may be similar to the graph 800.

At block 902, one or more tables may be accessed. As discussed above, in some embodiments, the one or more tables may provide port or address information as well as traffic and data flow information, such as an cmbd_tcp table and/or sa_flow_connection table. The one or more tables may also include tables having information regarding load balancer virtual IPs of a network (e.g., the network 112). Ports listed in the cmbd_tcp and/or the sa_flow_connection table (or other suitable table) may then be retrieved (block 904). As discussed above, the ports retrieved from the one or more tables may be discovered via the lsof command, the netstat command, and/or the netflow protocol. The ports retrieved from the one or more tables may then be filtered (block 806) such that the entry point algorithm 900 may now only be considering hypertext transfer protocol (http) ports and hypertext transfer protocol secure (https) ports (e.g., ports 80 and 443). In other words, ports retrieved from the one or more tables that are not http or https may be ignored in one implementation.

Nodes (e.g., the nodes 802) may then be graphed with edges (e.g., the edges 804) corresponding to communication between the ports (block 908). For example, as discussed above, a port from the cmbd_tcp table may be graphed as a node with an outgoing edge if a process is listening on the port and/or may be graphed as a node with an incoming edge if a process is connecting to the port. Similarly, ports from the sa_flow_communication table may be graphed as nodes if a connection (e.g., a chain) exists between ports. For example, if a connection exists from a first port to a second port, the first port and the second port may be graphed as first and second nodes, respectively, with an edge extending from (e.g., outgoing) the first node and being received by (e.g., incoming) the second node. Further, in some embodiments, separate graphs may be created from the cmbd_tcp table and the sa_flow_communication table. In some embodiments, the entry point algorithm 900 may create and utilize only a single graph from either the cmbd_tcp table or the sa_flow_communication table.

In some embodiments, the nodes of the graph may be sorted according to the number of incoming edges of the nodes (block 910). For example, in some embodiments, the filtered ports (e.g., the http and https ports) may be imported into a table and ordered (e.g., prioritized) based on the number of incoming connections. In certain embodiments, importing the ports may occur individually and/or in bulk. In some embodiments, a table may be generated with information regarding the filtered and/or ordered ports. However, in some embodiments, the nodes may be sorted according to the amount of incoming edges within a table after the ports have been graphed as nodes with their associated edges (e.g., connections). In this manner, the nodes, or ports, with the fewest amount of incoming edges may be identified. For example, as shown in FIG. 9, nodes 802*a* and 802*g* may be identified has having the fewest amount of incoming edges 804 (e.g., zero incoming edges) relative to other nodes 802 (e.g., nodes 802*b*, 802*c*, 802*d*, 802*e*, 802*f*) of the graph 800.

The nodes of the graph may then be traversed according to their edges (block 912). Particularly, the nodes of the graph may be traversed starting from a node with the fewest incoming edges while noting the nodes that are traversed (e.g., reachable). For example, in the embodiment shown in FIG. 9, the graph 800 may be traversed by starting from nodes 802*a* and/or 802*b* and proceeding to follow the outgoing edges 804. Indeed, whether starting from the node 802*a* or the node 802*b*, the next node that may be traversed is the node 802*b*, followed by the node 802*c*, and then the node 802*e*. From the node 802*e*, both of the nodes 802*d* and 802*f* may be traversed. Since the node 802*f* has no outgoing edges 804, no further nodes 802 may be traversed from the node 802*f*. Conversely, the node 802*d* has an outgoing edge 804 which leads to the node 802*b*. However, since 802*b* has already been traversed, and the node 802*d* has no other outgoing edges 804, no further nodes may be traversed from the node 802*d*. In this manner, if the graph 800 had been traversed starting from 802*a*, then 802*g* may not have been traversed (e.g., reachable). Similarly, if the graph 800 had been traversed starting from 802*g*, then the node 802*a* may not have been traversed.

Once the graph has been traversed, the nodes that were not traversed (e.g., unreachable) may be flagged as entry point candidates (block 914). Further, in some embodiments, the node(s) with the fewest incoming edges (e.g., a starting node) may also be flagged as an entry point candidate. In some embodiments, a table may be populated with the entry point candidates. Still further, in some embodiments, a node that is connected to a large amount of other nodes may be flagged as an entry point candidate. In other words, a node that is connected to a large sub-graph of nodes may be considered a suitable entry point for an enterprise service.

The entry point candidates may be reconciled with ports from one or more other tables (block 916). In other words, the entry point candidates may be compared to entry port candidates from other tables and may be disregarded if the entry point candidate is already known and/or exists in other tables. For example, as discussed above, the nodes that were considered to be potential entry point candidates were discovered as ports (e.g., the ports listed in the cmbd_tcp and/or sa_flow_connection tables) utilizing the lsof command, the netstat command, and/or the netflow protocol. However, some ports that may be suitable entry points (e.g., entry point candidates) may not have been discoverable in this manner and/or were already known. For example, in some embodiments, an entry point candidate may also be listed as a load balancer (e.g., the load balancer 118) with an associated virtual IP (VIP). However, load balancers may not be discoverable and/or identifiable via the lsof command, the netstat command, and/or the netflow protocol. Accordingly, the entry point candidates that are also listed as load balancers and/or are reachable from load balancers may not be suitable entry points. To illustrate, if an entry point candidate is listed a load balancer or is reachable from a load balancer, this may signify that the load balancer is at a higher level within an enterprise service than the entry point candidate. Accordingly, in some embodiments, a load balancer may be a suitable entry point if the load balancer is at a higher level within an enterprise service. That is, in some embodiments, one or more entry points may be imported from load balancer VIPs as suitable entry points to the enterprise service. Indeed, in some embodiments, a load balancer may be at an upper level of an enterprise service or somewhere between an upper level and a lower level. Therefore, if an entry point that was flagged as an entry point candidate was also listed as a load balancer or is reachable from a load balancer, the entry point candidate may not actually be a suitable entry point because it may not be at an upper level of an enterprise service, and as such, should not be considered as an entry point candidate. In other words, these entry point candidates that are associated with a load balancer may be un-flagged as entry point candidates. Indeed, the un-flagged candidate entry points may be removed from the table populated with the entry point candidates. Further, in some embodiments, an entry point candidate may be un-flagged as an entry point candidate if the enterprise service has already been mapped from the entry point candidate.

Once the entry point candidates have been identified, the enterprise service may be discovered and mapped (e.g., probed) starting from one or more of the entry point candidates (block 918). For example, as discussed above specifically with regard to FIG. 5, to discover and map an enterprise service (e.g., the enterprise service 401), an entry point associated with a CI (e.g., one of the CIs 110) may first be defined and the device hosting the CI (e.g., "the host") may be identified. Once the host is identified/found, the application (e.g., the CI) running on the host may be discovered (e.g., via service mapping 404). Once the CI associated with the entry point is discovered, other applications (e.g., other CIs) may also be discovered and mapped via the outgoing connections from the CI associated with the entry point, thereby enabling mapping of the enterprise service.

Further, in some embodiments, the table populated with the entry point candidates may include a column named source, which may be populated by netstat and netflow, and more particularly, by entries from the cmbd_tcp and sa_flow_connection tables to enable filtering. For example, in some embodiments, a user may wish to filter the candidate entry points to ports that were discovered based on active TCP connections and/or based on network statistics. Accordingly, the user may choose to filter the table populated by the entry point candidates to only show entry point candidates that exist in the cmbd_tcp table and/or were discovered using the lsof and/or netstat commands. Similarly, in some embodiments, a user may wish to filter the candidate entry points to ports that were discovered based on communication, or chains, between CIs. Accordingly, the user may choose to filter the table populated by the entry point candidates to only show entry point candidates that also exist in the sa_flow_communication table and/or were discovered using netflow protocol.

Suitable entry points for a network, and more specifically for an enterprise service, may be determined based on interconnectivity between ports of the network. To illustrate, in determining the suitable entry points, one or more tables may be considered. The one or more tables may include information associated with the ports such as active TCP connections between the ports and/or communications/chains between the ports. In some embodiments, the tables may be filtered such that only http or https ports are considered when determining the suitable entry points. The ports may be graphed with nodes of the graph representing the ports and edges between the nodes representing interconnectivity between the ports. In some embodiments, the nodes may be sorted according to a number of incoming edges associated with each node. The nodes may then be traversed starting from a node with a minimal amount of incoming edges. The untraversed nodes may be flagged as entry point candidates. In other words, nodes without incoming edges (e.g., unreachable nodes, untraversed nodes, etc.) may be flagged as suitable entry point candidates because their lack of incoming edges may signify that the node is associated with a port at an upper level of an enterprise service. Indeed, ports at the upper levels of enterprise service may be in communication with a large number of configuration items (CIs) of the enterprise service, thereby making the ports at the upper levels of the enterprise service suitable entry points to discover and map the CIs of the enterprise service. For example, to map an enterprise service, probes may gather information about the CIs of the enterprise service by following outbound connections from one CI to another. The gathered information may be stored in a database and retrieved to generate a map of the applications, or CIs, of the enterprise service.

The disclosed techniques enable configuration items of an enterprise service to be mapped without utilizing previous knowledge on entry points of the enterprise service. Indeed, it may be difficult and/or time consuming to gather information regarding the entry points. For example, gathering information regarding the entry points of an enterprise service may require surveying users of the enterprise service and/or keeping an updated record of the entry points. The disclosed techniques provide for determination of entry points of an enterprise service based on information included in tables storing information related to interconnectivity of CIs of the enterprise service. For example, as discussed above, one or more algorithms may utilize the information included in the pre-existing tables to determine suitable entry points. Specifically, the algorithm may identify entry points at upper levels of the enterprise service. In this manner, the enterprise service may be thoroughly mapped from one or more entry points that were obtained with minimal time and effort from a user of the enterprise service.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
graphing ports of a network as graph nodes with associated edges corresponding to communication between the ports based at least in part on previously obtained network traffic information;
traversing the graph nodes via the associated edges and recording traversed nodes and unreachable nodes;
flagging unreachable nodes as entry points; and
starting discovery of aspects of the network at one of the entry points.

2. The method of claim 1, comprising:
accessing one or more tables and retrieving the ports of the network from the one or more tables.

3. The method of claim 2, wherein the one or more tables comprises information regarding active transmission control protocol (TCP) connections between the ports of the network.

4. The method of claim 2, wherein the one or more tables comprises information regarding communication between the ports of the network.

5. The method of claim 1, comprising:
evaluating the graph nodes based on a number of incoming edges associated with each graph node of the graph nodes and identifying a first graph node with a fewest amount of incoming edges.

6. The method of claim 5, wherein traversing the graph nodes comprises traversing the graph nodes starting from the first graph node.

7. The method of claim 1, wherein the graphed ports of the network are hypertext transfer protocol (http) ports or hypertext transfer protocol secure (https) ports.

8. The method of claim 1, comprising:
generating a table of the entry points;
accessing one or more other tables listing alternative entry points;
comparing the table of the entry points against the listing of alternative entry points; and
removing the entry points of the table that have corresponding matches in the listing of alternative entry points.

9. The method of claim 8, wherein the listing of alternative entry points comprises information regarding virtual internet protocols (VIPs) of one or more load balancers of the network.

10. The method of claim 1, wherein discovering the aspects of the network comprises discovering, via a probe, configuration items (CIs) of the network based on connections between the CIs.

11. The method of claim 10, comprising:
creating a service map of the CIs and the connections between the CIs based on the entry points.

12. A system, comprising:
a non-transitory memory; and
one or more hardware processors configured to read instructions from the non-transitory memory to perform operations comprising:
generating a graph of nodes and edges, wherein the nodes are associated with ports of a network and the edges are associated with communication between the ports based at least in part on previously obtained network traffic information;
traversing the graph via the edges starting from a first node of the nodes;
identifying the nodes that are unreachable from the first node as entry point candidates of the network; and
starting discovery of configuration items of the network at one of the identified entry point candidates.

13. The system of claim 12, comprising:
accessing one or more tables, wherein the one or more tables comprises information regarding communications and/or connections between the ports of the network, and wherein the graph is based at least in part on the information of the one or more tables.

14. The system of 1, wherein discovering the configuration items of the network comprises probing the network starting at one of the entry point candidates.

15. The system of claim 12, wherein the first node has a least amount of incoming edges relative to other nodes of the nodes.

16. A tangible, non-transitory, machine-readable medium, comprising machine-readable instructions, configured to:
access one or more tables, wherein the one or more tables comprises information regarding ports of a network and interconnections of the ports;
graph the ports as nodes and the interconnections as edges between the nodes;
traverse the graph starting from a first node associated with a first port;
determine one or more entry points of the network based on the traversed graph;
discover, via a probe, the network starting at the entry points.

17. The machine-readable medium of claim 16, wherein the one or more entry points are reconciled with a table comprising information regarding one or more load balancers.

18. The machine-readable medium of claim 16, wherein the one or more entry points are determined based on which of the nodes of the traversed graph were reachable from the first node.

19. The machine-readable medium of claim 16, comprising machine readable instructions configured to sort the ports according to an amount of incoming communication paths of each port.

20. The machine readable medium of claim 16, wherein the graphed ports of the network are hypertext transfer protocol (http) ports or hypertext transfer protocol secure (https) ports.

* * * * *